(12) United States Patent
Tucker et al.

(10) Patent No.: US 8,287,673 B2
(45) Date of Patent: Oct. 16, 2012

(54) JOINING OF DISSIMILAR MATERIALS

(75) Inventors: Michael C. Tucker, Oakland, CA (US); Grace Y. Lau, Fremont, CA (US); Craig P. Jacobson, Moraga, CA (US)

(73) Assignee: The Regents of The University of California, Oakland, CA (US)

( * ) Notice: Subject to any disclaimer, the term of this patent is extended or adjusted under 35 U.S.C. 154(b) by 887 days.

(21) Appl. No.: 11/791,258

(22) PCT Filed: Nov. 29, 2005

(86) PCT No.: PCT/US2005/043109
§ 371 (c)(1),
(2), (4) Date: Feb. 12, 2008

(87) PCT Pub. No.: WO2006/091250
PCT Pub. Date: Aug. 31, 2006

(65) Prior Publication Data
US 2008/0118804 A1  May 22, 2008

Related U.S. Application Data

(60) Provisional application No. 60/632,030, filed on Nov. 30, 2004.

(51) Int. Cl.
*C03B 33/00* (2006.01)
*C04B 37/00* (2006.01)
*B32B 7/04* (2006.01)
*B29C 65/00* (2006.01)

(52) U.S. Cl. .................... 156/89.28; 156/89.11; 156/91; 156/283

(58) Field of Classification Search ............... 156/89.28, 156/89.11, 91, 283
See application file for complete search history.

(56) References Cited

U.S. PATENT DOCUMENTS
3,126,311 A * 3/1964 Harris ......................... 428/147
(Continued)

FOREIGN PATENT DOCUMENTS
CN  101065860  10/2007
(Continued)

OTHER PUBLICATIONS

CN patent application No. 200580040834.4, Office Action mailed Aug. 1, 2008.
(Continued)

*Primary Examiner* — Philip Tucker
*Assistant Examiner* — Alex Efta
(74) *Attorney, Agent, or Firm* — Weaver Austin Villeneuve & Sampson LLP

(57) ABSTRACT

A method of joining dissimilar materials having different ductility, involves two principal steps: Decoration of the more ductile material's surface with particles of a less ductile material to produce a composite; and, sinter-bonding the composite produced to a joining member of a less ductile material. The joining method is suitable for joining dissimilar materials that are chemically inert towards each other (e.g., metal and ceramic), while resulting in a strong bond with a sharp interface between the two materials. The joining materials may differ greatly in form or particle size. The method is applicable to various types of materials including ceramic, metal, glass, glass-ceramic, polymer, cermet, semiconductor, etc., and the materials can be in various geometrical forms, such as powders, fibers, or bulk bodies (foil, wire, plate, etc.). Composites and devices with a decorated/sintered interface are also provided.

17 Claims, 4 Drawing Sheets

U.S. PATENT DOCUMENTS

| | | | |
|---|---|---|---|
| 3,324,543 A | 6/1967 | McVey et al. | |
| 3,668,010 A | 6/1972 | Fally et al. | |
| 4,035,547 A * | 7/1977 | Heller et al. | 428/329 |
| 4,560,607 A * | 12/1985 | Sumner | 428/141 |
| 4,624,897 A | 11/1986 | Ito | |
| 4,687,717 A | 8/1987 | Kaun et al. | |
| 4,763,828 A | 8/1988 | Fukaya et al. | |
| 4,847,172 A | 7/1989 | Maskalick et al. | |
| 4,917,958 A | 4/1990 | Akai et al. | |
| 4,929,294 A | 5/1990 | Blome | |
| 4,942,999 A | 7/1990 | Oda et al. | |
| 5,013,612 A | 5/1991 | Hunt et al. | |
| 5,043,229 A | 8/1991 | Mizuhara | |
| 5,127,969 A | 7/1992 | Sekhar | |
| 5,236,787 A | 8/1993 | Grassi | |
| 5,279,909 A | 1/1994 | Horner et al. | |
| 5,441,825 A | 8/1995 | Barlow | |
| 5,487,803 A | 1/1996 | Sweeney et al. | |
| 5,626,914 A | 5/1997 | Ritland et al. | |
| 5,629,103 A | 5/1997 | Wersing et al. | |
| 5,672,848 A | 9/1997 | Komorita et al. | |
| 5,735,332 A | 4/1998 | Ritland et al. | |
| 6,007,683 A | 12/1999 | Jankowski et al. | |
| 6,188,582 B1 | 2/2001 | Peter | |
| 6,293,978 B2 | 9/2001 | Kleefisch et al. | |
| 6,296,910 B1 | 10/2001 | Choy et al. | |
| 6,348,273 B1 | 2/2002 | Ishikawa et al. | |
| 6,372,078 B1 | 4/2002 | Melchert et al. | |
| 6,390,354 B1 | 5/2002 | Makino et al. | |
| 6,420,064 B1 | 7/2002 | Ghosh et al. | |
| 6,428,920 B1 | 8/2002 | Badding et al. | |
| 6,435,565 B2 | 8/2002 | Potts et al. | |
| 6,440,578 B1 | 8/2002 | Shinkai et al. | |
| 6,541,146 B1 | 4/2003 | Xue et al. | |
| 6,565,621 B2 | 5/2003 | Shinkai et al. | |
| 6,656,625 B1 | 12/2003 | Thompson et al. | |
| 6,682,842 B1 | 1/2004 | Visco et al. | |
| 6,742,700 B2 | 6/2004 | Makino et al. | |
| 6,767,662 B2 | 7/2004 | Jacobson et al. | |
| 6,800,323 B2 | 10/2004 | Pan | |
| 6,896,992 B2 | 5/2005 | Kearl | |
| 6,974,516 B2 | 12/2005 | Devoe et al. | |
| 6,994,884 B1 | 2/2006 | Guan et al. | |
| 7,055,733 B2 | 6/2006 | Weil et al. | |
| 7,153,559 B2 | 12/2006 | Ito et al. | |
| 7,208,246 B2 | 4/2007 | Herman et al. | |
| 7,218,502 B2 | 5/2007 | Fujii et al. | |
| 7,273,673 B2 | 9/2007 | Akikusa et al. | |
| 2002/0081762 A1 | 6/2002 | Jacobson et al. | |
| 2003/0024611 A1 | 2/2003 | Cornie et al. | |
| 2003/0132270 A1 | 7/2003 | Weil et al. | |
| 2003/0188637 A1 | 10/2003 | Ito et al. | |
| 2003/0224234 A1 | 12/2003 | Steele et al. | |
| 2004/0023101 A1 | 2/2004 | Jacobson et al. | |
| 2004/0028994 A1 | 2/2004 | Akikusa et al. | |
| 2004/0112478 A1 | 6/2004 | Bieler et al. | |
| 2004/0135324 A1 | 7/2004 | Brule et al. | |
| 2004/0219423 A1 | 11/2004 | Tunney et al. | |
| 2004/0240142 A1 | 12/2004 | Fujii et al. | |
| 2005/0000621 A1 | 1/2005 | Devoe et al. | |
| 2005/0022921 A1 * | 2/2005 | Morrison et al. | 156/89.11 |
| 2005/0048343 A1 * | 3/2005 | Thirukkvalur | 429/32 |
| 2005/0221153 A1 * | 10/2005 | Sugimoto et al. | 429/38 |
| 2005/0271084 A1 | 12/2005 | Finnerty | |
| 2006/0234112 A1 | 10/2006 | Visco et al. | |
| 2007/0117006 A1 | 5/2007 | Zhan et al. | |
| 2008/0131723 A1 | 6/2008 | Tucker et al. | |
| 2008/0268323 A1 | 10/2008 | Tucker et al. | |
| 2010/0038012 A1 | 2/2010 | Tucker et al. | |
| 2010/0143824 A1 | 6/2010 | Tucker et al. | |
| 2011/0053041 A1 | 3/2011 | Tucker et al. | |
| 2011/0104586 A1 | 5/2011 | Tucker et al. | |
| 2011/0269047 A1 | 11/2011 | Tucker et al. | |

FOREIGN PATENT DOCUMENTS

| | | |
|---|---|---|
| CN | 200580040834 | 10/2007 |
| CN | 200580041105 | 11/2007 |
| EP | 0428275 | 5/1991 |
| EP | 0562724 | 9/1993 |
| EP | 1122806 | 8/2001 |
| EP | 1699104 | 9/2006 |
| FR | 1585403 | 1/1970 |
| GB | 1276615 | 6/1972 |
| GB | 2156257 | 10/1985 |
| JP | 59-015960 | 1/1984 |
| JP | 59-016695 | 1/1984 |
| JP | 60-090875 | 5/1985 |
| JP | 05-089883 | 4/1993 |
| JP | 05-163078 | 6/1993 |
| JP | 07-069749 | 3/1995 |
| JP | 07-126079 | 5/1995 |
| JP | 07-237980 | 9/1995 |
| JP | 07-267747 | 10/1995 |
| JP | 09-188582 | 7/1997 |
| JP | 09-296203 | 11/1997 |
| JP | 10-021931 | 1/1998 |
| JP | 11-292618 | 10/1999 |
| JP | 11-297333 | 10/1999 |
| JP | 2001-126745 | 5/2001 |
| JP | 2002-289249 | 10/2002 |
| JP | 2002-301588 | 10/2002 |
| JP | 2003-288913 | 10/2003 |
| JP | 2004-039574 | 2/2004 |
| JP | 2004-047598 | 2/2004 |
| JP | 2004-127761 | 4/2004 |
| JP | 2004142971 | 5/2004 |
| JP | 2004-164864 | 6/2004 |
| JP | 2004207088 A * | 7/2004 |
| JP | 2005-288526 | 10/2005 |
| RU | 2236331 | 1/2003 |
| RU | 2197441 | 9/2004 |
| SU | 1407675 | 7/1988 |
| SU | 1822388 | 6/1993 |
| WO | 99/52165 | 10/1999 |
| WO | 99-65642 | 12/1999 |
| WO | 99-66570 | 12/1999 |
| WO | 00-34539 | 6/2000 |
| WO | 00/52780 | 9/2000 |
| WO | 2003/07312 | 1/2003 |
| WO | 2004-008556 | 1/2004 |
| WO | 2004-070858 | 8/2004 |
| WO | 2006/044313 | 4/2006 |
| WO | 2006/086037 | 8/2006 |
| WO | 2006/091250 | 8/2006 |
| WO | 2006/116153 | 11/2006 |
| WO | 2006-127045 | 11/2006 |
| WO | 2008/016345 | 2/2008 |
| WO | 2009/014775 | 1/2009 |
| WO | 2009/099447 | 8/2009 |
| WO | 2009/128849 | 10/2009 |
| WO | 2010/030300 | 3/2010 |

OTHER PUBLICATIONS

CN patent application No. 200580041105.0, Office Action mailed Oct. 24, 2008.

RU patent application No. 200712448309, Office Action mailed Jan. 26, 2009.

WO patent application No. PCT/US05/42995, International Search Report and Written Opinion mailed Dec. 26, 2006.

WO patent application No. PCT/US05/42572, International Search Report and Written Opinion mailed Jun. 29, 2006.

Stevenson, Jeff, "SOFC Seals: Materials Status", SECA Core Technology Program—SOFC Meeting, Jul. 8, 2003, 28 pages.

Zhou, Xia et al., "Fabrication of composite alloy cladding material by brazing process", Journal of Materials Processing Technology 168 (2005) 280-285.

Zhu, Minguang et al., "Improving the strength of brazed joints to alumina by adding carbon fibres", 0022-2461, Apr. 17, 1997, Chapman & Hall.

Blugan, Gurdial et al., "Brazing of silicon nitride ceramic composite to steel using SiC-particle-reinforced active brazing alloy", 0272-8842, Mar. 10, 2006, Elsevier Ltd. and Techna Group.

CN200580040834.4, Notification to grant patent right for invention, mailed Apr. 17, 2009.

CN200580041105.0, Notification to grant patent right for invention, mailed Aug. 28, 2009.
EP patent application No. 05857595.2, Search Report mailed Oct. 15, 2009.
EP patent application No. 05857980.6, Supplemental Search Report mailed Dec. 15, 2009.
EP patent application No. 05857587.9, Supplemental Search Report mailed Oct. 26, 2009.
MY patent application No. PI20055578, Examination Report mailed Aug. 14, 2009.
RU patent application No. 2007124484-02, Office Action mailed Nov. 16, 2009.
TW patent application No. 094141561, Examination Report mailed Mar. 8, 2010.
VN patent application No. 1-2007-01278, Exam Report mailed Jul. 7, 2007.
VN patent application No. 1-2007-01267, Exam Report mailed Jul. 29, 2009.
Naka, Masaaki et al., "Joining of plain carbon steel to alumina with copper filler metal", Yosetsu Gakkai Ronbunshu—Quarterly Journal of the Japan Welding Society, Yosetsu Gakkai, Tokyo, Japan, vol. 3, No. 4, Nov. 1, 1985, pp. 702-707, XP009010006, ISSN: 0288-4771.
WO patent application No. PCT/US2008/060362, International Search Report and Written Opinion mailed Jan. 12, 2009.
WO patent application No. PCT/US2008/066737, International Search Report and Written Opinion mailed Jan. 29, 2009.
WO patent application No. PCT/US2008/053869, International Search Report and Written Opinion mailed Oct. 29, 2008.
WO patent application No. PCT/US2008/081531, International Search Report and Written Opinion mailed Mar. 31, 2009.
Lee, Sungkyu et al., "Fabrication and characterization of Cu/YSZ cermet high-temperature electrolysis cathode material prepared by high-entergy ball-milling method I. 900°C-sintered", Journal of Alloys and Compounds 448 (2008) 363-367, Aug. 17, 2007.
Gorte, Raymond J. et al., "Anodes for direct oxidation of dry hydrocarbons in a solid-oxide fuel cell", Advanced Materials, 2000, 12, No. 19, pp. 1465-1469, Oct. 2, 2000.
Park, Seungdoo et al., "Direct oxidation of Hydrocarbons in a solid Oxide Fuel Cell I. Methane Oxidation" Journal of the Electrochemical Society, 146 (10) 3603-3605 (1999), Mar. 8, 1999.
U.S. Appl. No. 12/304,191, "Joined Concentric Tubes", Tucker et al., filed May 21, 2009.
U.S. Appl. No. 12/664,646, "Interlocking structure for high temperature electrochemical device and method for making the same", Tucker et al., filed Dec. 14, 2009.
U.S. Appl. No. 61/046,313, "Integrated seal for high-temperature electrochemical device", Tucker et al., filed Apr. 18, 2008.
U.S. Appl. No. 61/025,987, "CU-based cermet for high-temperature electrochemical device", Tucker et al., filed Feb. 4, 2008.
U.S. Appl. No. 61/026,079, "CU-based cermet for high-temperature electrochemical device", Tucker et al., filed Feb. 4, 2008.
U.S. Appl. No. 61/096,177, "Metal-supported, segmented-in-series high temperature electrochemical device", Tucker et al., filed Sep. 11, 2008.
WO patent application No. PCT/US2006/029580, International Search Report and Written Opinion mailed Jul. 3, 2008.
Stevenson, Jeff, "SOFC Seals: Material status", SECA Core Technology Program—SOFC Meeting, Jul. 8, 2003, 28 pages.
Li, J.Q. et al., Fabrication and thermal properties of a YSZ-NiCr joint with an interlayer of YSZ-NiCr functionally graded material, Journal of the European Ceramic Society 23 (2003) 1847-1853.
PCT patent application No. PCT/US05/43109, International Search Report dated Oct. 12, 2006.
PCT patent application No. PCT/US05/43109, Written Opinion dated Oct. 12, 2006.
AU patent application No. 2005327925, Office Action mailed Jul. 5, 2010.
AU patent application No. 2005327164, Office Action mailed Aug. 6, 2010.
JP patent application No. 2007-543481, Exam Report mailed Oct. 5, 2010.
WO patent application No. PCT/US05/042572 International Preliminary Report on Patentability mailed Jun. 5, 2007.
AU patent application No. 2005332026, Exam Report mailed Sep. 29, 2010.
CA patent application No. 2,627,786, Office Action mailed Dec. 21, 2010.
JP patent application No. 2007-543481, Notification of reasons for rejection, mailed Oct. 5, 2010 (English translation).
Translated excerpt from JP 2005-288526.
Translated excerpt from JP2004-047598.
CN patent application No. 200680055443.4, Office Action mailed Dec. 21, 2010.
RU patent application No. 200910693002, Office Action mailed Sep. 21, 2010.
U.S. Appl. No. 11/791,269, Office Action mailed Dec. 27, 2010.
EP patent application No. 08768912.1-3122, Examination Report mailed Feb. 14, 2011.
JP patent application No. 2007-543579, Office Action mailed Jan. 25, 2011.
EP patent application No. 08770865.7, Examination Report mailed Jun. 17, 2011.
U.S. Appl. No. 11/791,269, Office Action mailed Sep. 30, 2011.
U.S. Appl. No. 12/304,191, Office Action mailed Sep. 30, 2011.
EP patent application No. 05857587.9, Examination Report mailed Aug. 15, 2011.
MY patent application No. PI20055579, Substantive Examination Adverse Report mailed Aug. 15, 2011.
CN patent application No. 200680055443.4, Second Office Action mailed Jul. 12, 2011.
EP patent application No. 08826523.6, Supplemental European Search Report mailed Aug. 30, 2011.
PH patent application No. 12008502790, Office Action mailed Sep. 12, 2011.
U.S. Appl. No. 11/791,270, Office Action mailed Jul. 27, 2011.
JP patent application No. 2007-543579, Final Decision of Rejection mailed Oct. 4, 2011.
CA patent application No. 2,627,863, Office Action mailed Nov. 17, 2011.
JP patent application No. 2007-543481, Office Action mailed Nov. 29, 2011.
JP patent application No. 2009-521730, Office Action mailed Oct. 25, 2011.
MY patent application No. PI20055578, Substantive Examination mailed Dec. 30, 2011.
KR patent application No. 10-2007-7009946, Notification of Provisional Rejection mailed Jan. 20, 2012.
IN patent application No. 2386/KOLN/2007, First Examination Report mailed Jan. 31, 2012.
EP patent application No. 06836096.5, Supplementary European Search Report mailed Feb. 3, 2012.
Ishida et al., NGK Spark Plug Co. Ltd., abstract of JP 19830079832, Thomson Scientific, XP-002667365, Nov. 21, 1984.
Fujiki et al., Kobe Steel Ltd., abstract of JP 19960109959, Thomson Scientific, XP-002667366, Nov. 18, 1997.
AU patent application No. 2008279577, Examiner's first report mailed Jan. 27, 2012.
PH patent application No. 12010500175, Office Action mailed Feb. 2, 2012.
RU patent application No. 2010136676/20, Office Action of the Formal Examination mailed Jan. 17, 2011.

* cited by examiner

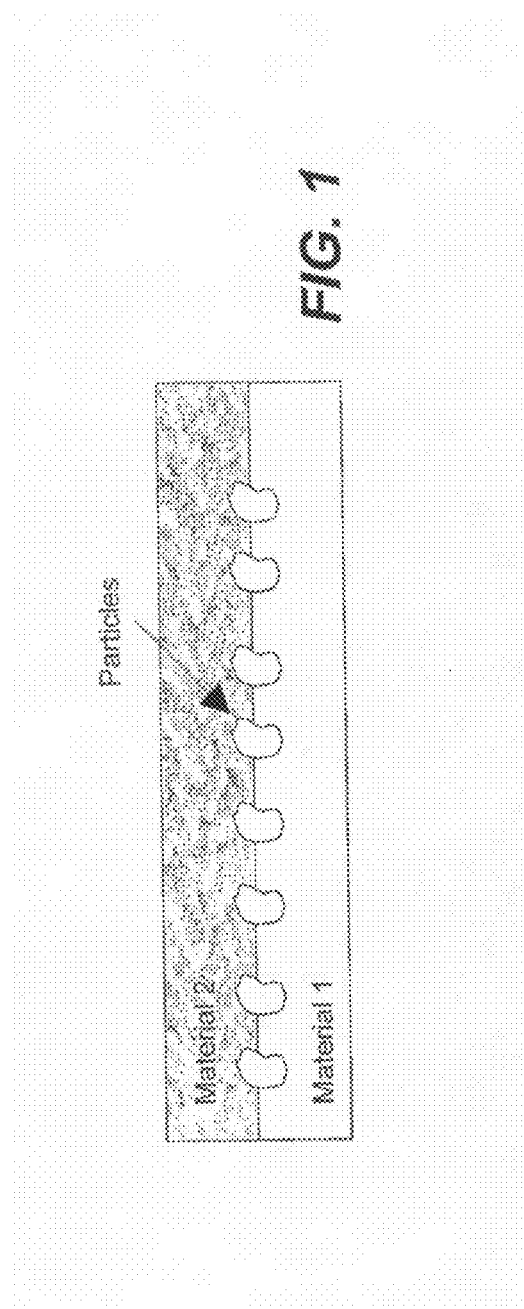
FIG. 1
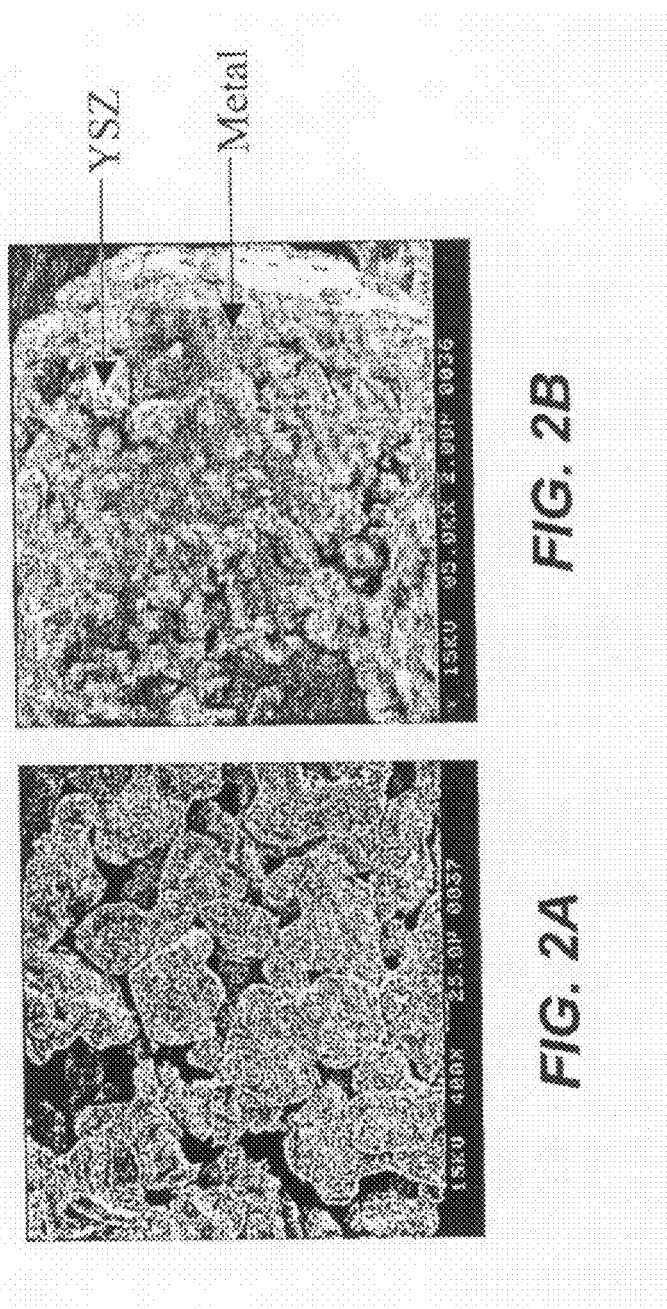
FIG. 2A
FIG. 2B

US 8,287,673 B2

JOINING OF DISSIMILAR MATERIALS

CROSS-REFERENCE TO RELATED APPLICATIONS

This application claims priority to U.S. Provisional Patent Application No. 60/632,030 filed Nov. 30, 2004, entitled JOINING OF DISSIMILAR MATERIALS. This provisional patent application is incorporated herein by reference in its entirety for all purposes.

STATEMENT OF GOVERNMENT SUPPORT

This invention was made with government support under Contract DE-AC02-05CH11231 awarded by the United States Department of Energy to The Regents of the University of California for the management and operation of the Lawrence Berkeley National Laboratory. The government has certain rights in this invention.

FIELD OF THE INVENTION

The invention relates to the joining of dissimilar materials, such as metal and ceramic, by means of decoration and sinter bonding.

BACKGROUND

Numerous methods are available for joining dissimilar materials, such as metal and ceramic, having different ductility, Many methods require the introduction of a third material into the joint, e.g., solder, braze, weld filler, or adhesive. This can limit the usefulness of the joint, especially for devices where utility is derived from the interface itself (such as electrochemical devices), or where the third material is incompatible with the system requirements (such as in medical implants). Typical methods for joining metals to ceramics include: chemical reaction between the metal and ceramic; brazing using a filler alloy that bonds to both the metal and ceramic; and, the use of a cermet (mixture of metal and ceramic typically of similar particle size) between the metal and ceramic to act as a transition zone. All of these methods have limitations.

Thus, there exists a need for improved techniques for joining dissimilar materials, such as ceramics and metals.

SUMMARY OF THE INVENTION

The present invention provides a method of joining dissimilar materials having different ductility. The method involves two principal steps: Decoration of the more ductile material's surface with particles of a less ductile material to produce a composite; and, sinter-bonding the composite produced to a joining member of a less ductile material. The joining method is suitable for joining dissimilar materials that are chemically inert towards each other (e.g., metal and ceramic), while resulting in a strong bond with a sharp interface between the two materials.

The joining materials may differ greatly in form or particle size. For example, the joining member may be a dense, monolithic piece of the less ductile material, a porous piece of the less ductile material, or particles of the less ductile material. Structures with interlayers or multiple layers may be formed. For example, a decorated composite may be sintered to a dense less ductile material via a porous less ductile material interlayer.

The particles decorating the more ductile material surface, the joining member and any additional members may be composed of the same material (e.g., ceramic such as YSZ) or different materials that sinter to one another (e.g., one or more ceramics and/or cermets, such as YSZ and LSM).

For the purposes of illustration, the invention is described in the context of joining metal (more ductile) and ceramic (less ductile). However, it should be understood that the invention is applicable to other types of materials as well (glass, glass-ceramic, polymer, cermet, semiconductor, etc.). The materials can be in various geometrical forms, such as powders, fibers, or bulk bodies (foil, wire, plate, etc.).

Also provided are composites and devices with a decorated and sintered interface.

BRIEF DESCRIPTION OF THE DRAWINGS

FIG. 1 conceptually illustrates a bond relying on mechanical interlocking to particles or fibers at the interface of two surfaces.

FIGS. 2A and B show scanning electron micrographs (SEMs) of the surface of steel particles decorated with yttria-stabilized zirconia (YSZ) ceramic particles.

DETAILED DESCRIPTION OF THE INVENTION

Figure 3:
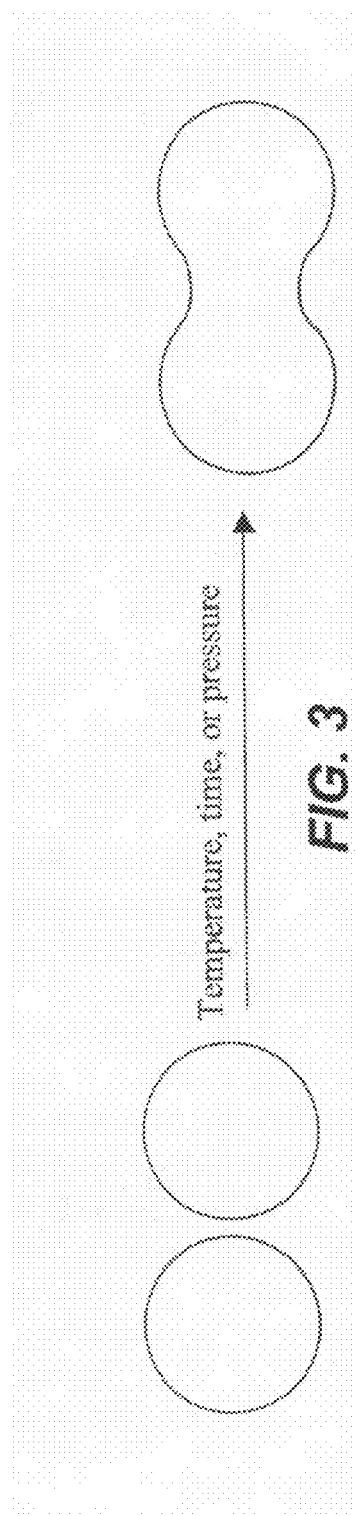
FIG. 3 is a schematic figure of sintering.

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments. On the contrary, it is intended to cover alternatives, modifications, and equivalents as may be included within the scope and equivalents of the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Bonds relying on mechanical interlocking to particles or fibers at the interface of two surfaces are known. The particles or fibers can be created from the material of the surface or added to the surface by melting or pressing. However, techniques for joining dissimilar materials like ceramics and metals using this concept, schematically illustrated in FIG. 1, are unknown.

Examples of sinter bonding between dissimilar materials, e.g., ceramics and metals are also known. Generally, a graded joint is formed from an interlayer mixture of metal and ceramic powders. Near the ceramic joining surface the interlayer mixture is rich in ceramic powder. Near the metal joining surface, the interlayer is rich in metal. The composite structure is sintered, yielding two interpenetrating lattices: one displaying ceramic-ceramic bonding and one displaying metal-metal bonding. Such joints tend to be undesirably weak and thick. Throughout the thickness of the joint, the materials properties are expected to be intermediate to those of the ceramic and metal individually. This can be undesirable, especially in the case that the materials properties must change quickly at the joint/interface to provide utility to the resulting device. Such is the case for thermal barrier coatings, where it is desirable to have a thin layer with low thermal conductivity (usually ceramic) covering a metal part. This is also the case for fuel cell current collectors, where it is desirable to have a rapid change in particle size and electrical conductivity mechanism at the interface between the metal current collector and ceramic active layer. Typically, graded joints display low porosity in order to have a strong joint. It is believed that the dual sintering and mechanical interlocking provided by the present invention allows reasonable joint strength to be achieved over a wide range of final joint porosity, thus increasing the range of application for the invention relative to graded joints.

The present invention provides a method of joining dissimilar materials having different ductility. The joining method is suitable for joining dissimilar materials that are chemically inert towards each other (that is, an effective chemical bond between the materials is not possible) (e.g., metal and ceramic), while resulting in a strong bond with a sharp interface between the two materials.

The method involves two principal steps: Decoration of the more ductile material's surface with particles of a less ductile material to produce a composite; and, sinter-bonding the composite produced to a joining member of the less ductile material. The joining method is suitable for joining dissimilar materials that are chemically inert towards each other (e.g., metal and ceramic), while resulting in a strong bond with a sharp interface between the two materials.

The joining materials may differ greatly in form or particle size. For example, the joining member may be a dense, monolithic piece of the less ductile material, a porous piece of the less ductile material, or particles of the less ductile material. Structures with interlayers or multiple layers may be formed. For example, a decorated composite may be sintered to a dense less ductile material via a porous less ductile material interlayer.

The particles decorating the more ductile material surface, the joining member and any additional members may be composed of the same material (e.g., ceramic such as YSZ) or different materials that sinter to one another (e.g., one or more ceramics and/or cermets, such as YSZ and LSM).

The method of the invention, and associated composites and devices, will now be described with reference to specific embodiments illustrated in the figures. For the purposes of illustration, the invention is described in the context of joining metal (more ductile) and ceramic (less ductile). However, it should be understood that the invention is applicable to other types of materials as well (glass, glass-ceramic, polymer, cermet, semiconductor, etc.). The materials can be in various geometrical forms, such as powders, fibers, or bulk bodies (foil, wire, plate, etc.).

Step 1. Decoration of a ductile surface with particles of a less ductile material.

"Decoration" is to be understood as the process of mechanically embedding, impregnating, pushing, or forcing or otherwise bonding a less ductile material into the surface of a more ductile material. "Ductility" is, generally speaking, the ability of a material to deform upon application of a tensile force. For instance, the surface of a metal body or particle can be decorated with ceramic particles by pushing the ceramic into the surface of the metal. The metal will deform around the ceramic particle, and friction, stress, and/or mechanical interlocking will prevent the ceramic particle from being easily removed from the metal surface.

FIGS. 2A and B show low and high magnification scanning electron micrographs (SEMs) of the surface of steel particles decorated with yttria-stabilized zirconia (YSZ) ceramic particles. In this case, the two types of particles were mixed together in an attritor mill under isopropyl alcohol (IPA). A binder (hydroxypropylcellulose, HPC) was added to the mixing medium in order to form agglomerates of the YSZ on the surface of the metal particles. Such agglomerates improve the sinter-bonding achieved in Step 2. During the shearing action of the attritor mill, the YSZ particles were forced into the surface of the metal particles, and remain embedded in the surface after milling.

In alternative embodiments, the decoration may be achieved by alternate techniques, such as by chemically bonding the decorating material to the surface via a bonding agent, or the surface could be melted to accept the decorating material.

Step 2. Sinter-bonding the composite produced in Step 1 to a joining member of the less ductile material.

Sintering is often used to join particles of similar materials. The process comprises the formation of necks between neighboring particles. The reduction of surface area/surface tension is the driving force for this process. Sintering is shown schematically in FIG. 3. Sinter-bonding can be used to join the less ductile surface particles of a decorated composite to a joining member of the less ductile material. The degree of sintering can be controlled such that the joining materials remain porous or become dense.

In some embodiments, the joining member may be an interlayer used between materials being sintered. For example, metal particles decorated with YSZ, such as described above, may be joined to a dense YSZ member by way of a particulate YSZ interlayer. The interlayer promotes a strong bond between the decorated particles and the dense YSZ layer. Of course, the composite may also be directly sinter-bonded via the decorated particles on its surface to a dense surface, without an interlayer present, or to a porous surface or particulate material without a dense member present.

In some cases, the metal particles may experience some metal-metal sintering. Although this is not required for joining the metal particles to the YSZ member, it is required to have a low-resistance path for electrons to pass through the porous metal, and so is desirable for a solid oxide fuel cell (SOFC) current collector. Metal/metal sintering may not be required for other non-SOFC applications of this invention.

Figure 4A:
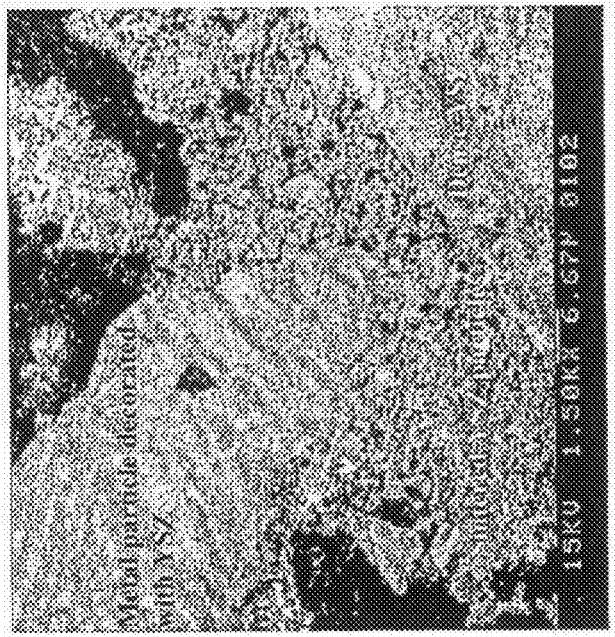
FIGS. 4A and B show cross-sectional SEM images of the joint between decorated metal particles and a dense YSZ member via a porous YSZ interlayer in accordance with one embodiment of the invention.
Figure 4B:
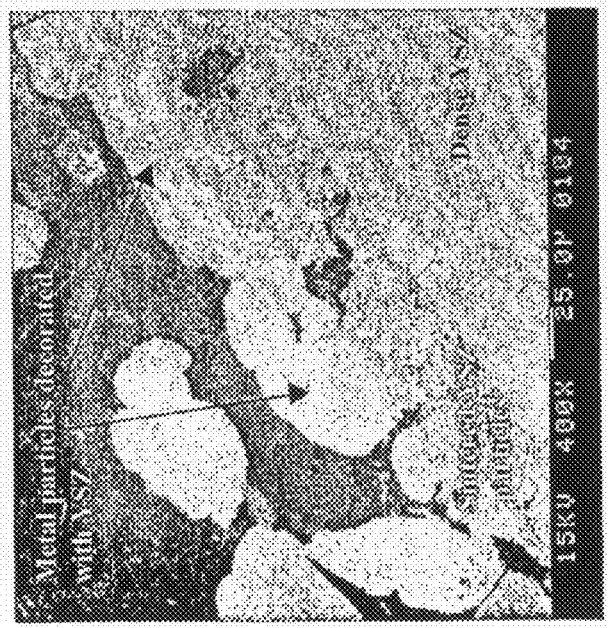

FIGS. 4A and B show cross-sectional SEM images of the joint between decorated metal particles and a dense YSZ member via a porous YSZ interlayer. Sinter bonds exist between: the individual metal particles; the decorating YSZ and the sintered YSZ particle porous interlayer; and, the sintered YSZ particle porous interlayer and the dense YSZ member.

Figure 5:
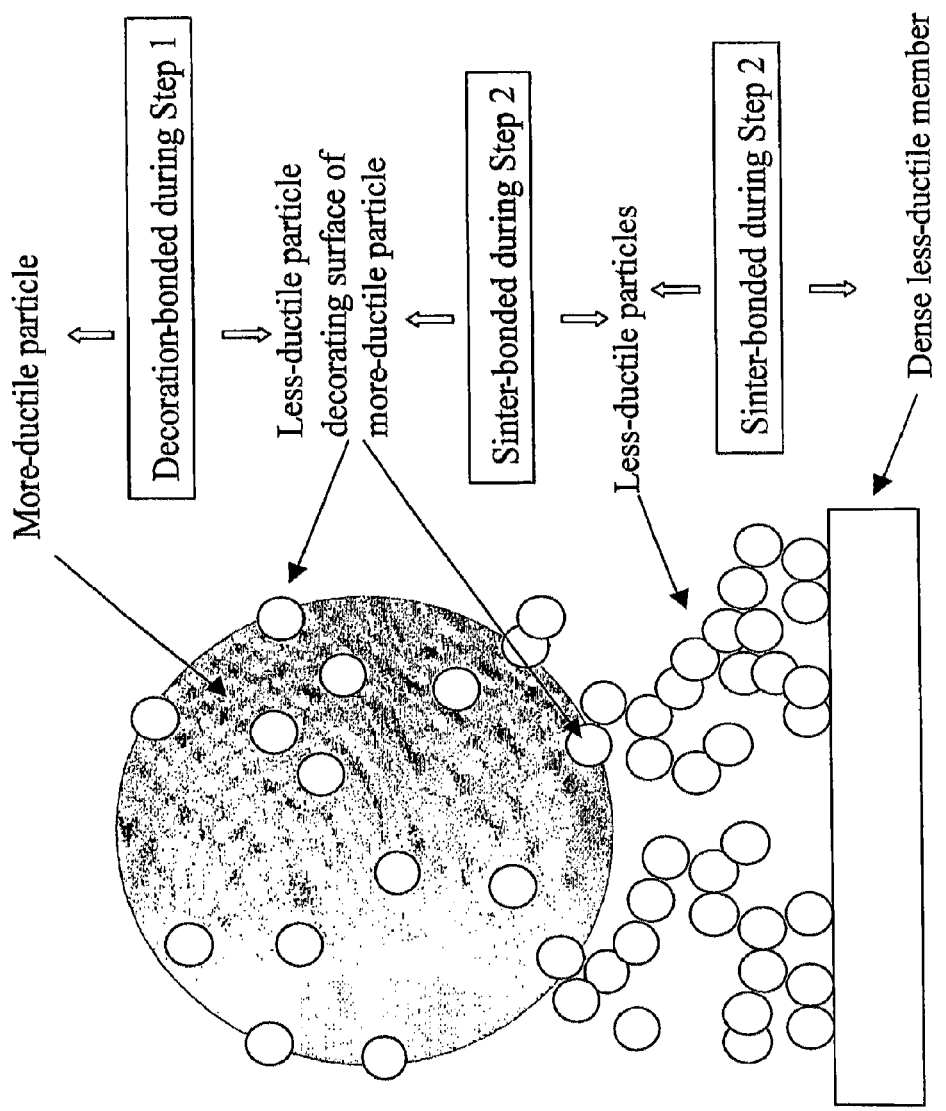
FIG. 5 is a schematic representation of the joint shown in FIGS. 4A and B

FIG. 5 is a schematic representation of the joint shown in FIGS. 4A and B and illustrates the joining method of the present invention for that specific embodiment. Of course, the porous interlayer is optional, and the decorated metal material may be directly bonded to the dense ceramic or cermet in other embodiments.

Thus, in one aspect, the invention relates to a method of joining dissimilar materials having different ductility. The method involves decorating the more ductile material's surface with particles of a less ductile material to produce a composite; and, sinter-bonding the composite produced to a joining member of the less ductile material. The joining method is suitable for joining dissimilar materials that are chemically inert towards each other (e.g., metal and ceramic), while resulting in a strong bond with a sharp interface between the two materials. A binder, such as hydroxypropylcellulose (HPC), may be added to the mixing medium during decoration in order to form agglomerates of the decorating material on the surface of the decorated material in order to enhance sinter bonding.

The decoration generally partially covers the decorated surface, for example between about 10-80% of the surface area of a more ductile material is decorated with a less ductile material. Some specific useful sub-ranges are 30-60%, about 50%, or about 20-30% surface area coverage.

In various embodiments of the invention, the pre-sintered size of the decorating particles is between about 10 and 0.05 micrometers, e.g., 0.5 micrometers.

In a specific embodiment, the invention joins a metal, particularly Fe, Ni, Cu, Ag, Al, Ti, alloys containing Ni, alloys containing Cu, alloys containing Ag, alloys containing Al, alloys containing Ti, Cr-containing alloys based on Ni or Fe, or stainless steel (a ferrous alloy with a minimum of 10.5% Cr), and a ceramic, particularly YSZ.

In many embodiments, the ceramic material is solely ionically conductive (e.g., YSZ), but in other embodiments one or more of the ceramic materials may be a mixed ionic-electronic conductor (e.g., LSM, ceria, etc.) Suitable ceramic components include: $La_{1-x}Sr_xMn_yO_{3-\delta}$ ($1 \geq X \geq 0.05$) ($0.95 \leq y \leq 1.15$) ("LSM") ($\delta$ is defined as that value signifying a small deviation from perfect stoichiometry) (e.g., $La_{0.8}Sr_{0.2}MnO_3$ and $La_{0.65}Sr_{0.30}MnO_{3-\delta}$ and $La_{0.45}Sr_{0.55}MnO_{3-\delta}$); $La_{1-x}Sr_xCoO_{3-\delta}$ ($1 \geq X \geq 0.10$) ("LSC"); $La_{1-x}Sr_xFe_yO_{3-\delta}$ ($1 \geq X \geq 0.05$) ($0.95 \leq y \leq 1.15$) ("LSF"), $SrCo_{1-x}Fe_xO_{3-\delta}$ ($0.30 \geq X \geq 0.20$), $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$ yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15), $(Bi_2O_3)_{0.75}(Y_2O_3)_{0.25}$, alumina and ceria.

Suitable metal components, including for the cermets, are transition metals, Cr, Fe, Ag and/or alloys such as stainless steel; low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5Fe1Y and chrome-containing nickel-based alloys such as Ni20Cr and Inconel alloys including Inconel 600 (Ni 76%, Cr 15.5%, Fe 8%, Cu 0.2%, Si 0.2%, Mn 0.5%, and C 0.08%).

The invention uses the difference in mechanical properties of the materials to be joined, as well as the capacity of the less ductile material to sinter, rather than relying on any chemical interaction between the materials. The invention enables a joint to be produced in a relatively short time without the introduction of additional materials being necessary, and results in a strong bond with a sharp interface between the two materials.

Figure 6:
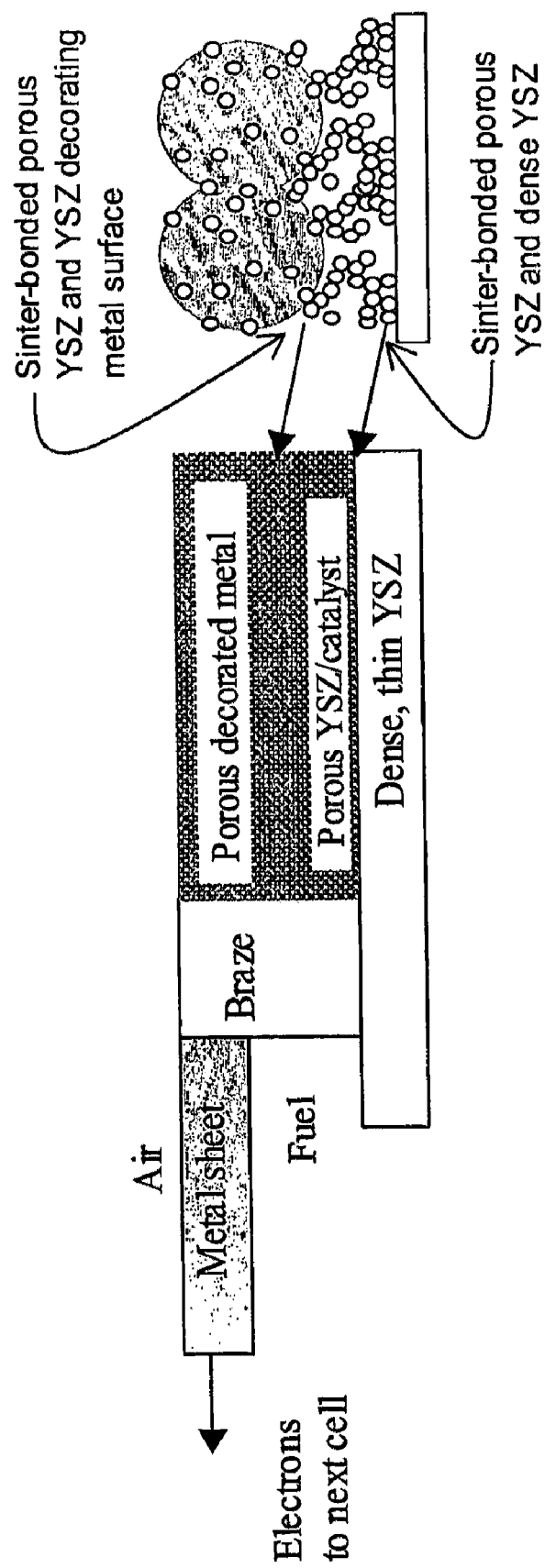
FIG. 6 illustrates a steel current collector joined to a ceramic in a solid oxide fuel cell in accordance with one embodiment of the present invention.

The technique of the present invention may be used in the manufacture of solid oxide fuel cells and related electrochemical devices. Metallic current collectors are typically connected to solid oxide fuel cells by soldering, brazing, or simple mechanical pressing contact (no bond). The present invention provides a more reliable current collector-cell bond without the introduction of solder or braze to join a metallic current collector to a ceramic in a solid oxide fuel cell. In a particular implementation, depicted in FIG. 6, a porous metal (e.g., stainless steel) current collector is decorated with ceramic (YSZ) particles as described herein, to form a composite. The composite is joined to a dense ceramic (YSZ) substrate via a porous YSZ interlayer.

In addition to joining metals and ceramics in solid oxide fuel cells, the invention finds use in other applications and with other materials sets, including glass, glass-ceramic, polymer, cermet, semiconductor, etc. Some other sample applications for the invention include:

1. bonding metal current collectors to ceramics in a fuel cell or other electrochemical device;
2. bonding thermal barrier layers to metal parts for use in high temperature processes (gas turbines, rocket engines, etc.);
3. bonding wear-resistant layers to metal parts (machines, medical implants, golf clubs, etc.);
4. bonding electrodes to capacitor bodies;
5. modifying the surface of a metal/ductile part to be more abrasive, less prone to corrosion, more insulating, etc.;
6. modifying the surface of a ceramic/less-ductile part to be less abrasive, more ductile, more conductive, more reflective, etc.;
7. creating ceramic decorative effects on a metal body or vice versa.

In another aspect, the invention relates to a composite of dissimilar materials having different ductility, and to electrochemical devices incorporating such a composite. The composite has a more ductile material, a less ductile material, and an interface between the more and less ductile materials comprising particles of a less ductile material decorated on the surface of the more ductile material and sintered to the less ductile material.

EXAMPLE

The following example describes and illustrates aspects and features of a specific implementation in accordance with the present invention. It should be understood the following is representative only, and that the invention is not limited by the detail set forth in this example.

Bonding a Steel Current Collector to a Solid Oxide Fuel Cell Structure

As noted above, FIG. 2 shows the surface of ferritic 70Fe-30Cr stainless steel articles decorated with yttria-stabilized zirconia (YSZ) particles. YSZ is the standard electrolyte material for solid oxide fuel cells. The two types of particles were mixed together in an attritor mill under isopropyl alcohol (IPA). A binder (hydroxypropylcellulose, HPC) was added to the mixing medium in order to form agglomerates of the YSZ on the surface of the metal particles. The shearing action of the attritor mill forces the YSZ particles into the surface of the metal particles, where they remain embedded after milling. The metal particles decorated with YSZ were joined to each other (metal-metal sintering) and to a dense YSZ member by means of a particulate YSZ interlayer by sintering, resulting in a strong bond with a sharp interface between the two materials. FIGS. 4A and B show cross-sectional images of the joint between decorated metal particles and a dense YSZ member. Sinter bonding of the joint members was achieved by co-firing in 4% $H_2$/96% Argon for 4 hours at 1300° C. Sinter bonds exist between: the individual metal particles; the decorating YSZ and the sintered YSZ particles; and, the sintered YSZ particles and the dense YSZ member. For comparison, physical mixtures of YSZ and metal particles were sintered onto similar dense YSZ substrates with and without a porous YSZ interlayer, resulting in a very weak bond or no bond. Thus, the decoration step is seen to be critical to the quality of the resulting metal-ceramic bond.

Improved bonding was achieved using a wide variety of YSZ particles as the decorating YSZ. The best bonds were achieved when using submicron-size YSZ particles (about 0.5 micrometer diameter), although decoration by particles and fibers with dimensions up to 10 micrometer also promoted bonding. The range of YSZ loading during the decoration step was varied between 1:99-4:96 weight ratio of YSZ to metal. Good bonding was observed over this entire range, with the strongest bond occurring for the 4:96 ratio. Higher YSZ loadings were not studied because the metal surface seemed to be saturated with YSZ at the 4:96 ratio, with some excess YSZ filling the pores between the decorated metal particles. This excess YSZ would block gas transport in a working fuel cell and is therefore undesirable for that application. Other applications of the invention might not require an open pore structure, in which case higher loadings of the decorating material would be appropriate.

CONCLUSION

Thus, the invention encompasses a decoration/sintering joining method suitable for dissimilar materials having different ductility resulting in a strong bond with a sharp interface between the two materials. Composites and devices with a decorated/sintered interface are also provided.

Although the foregoing invention has been described in some detail for purposes of clarity of understanding, it will be apparent that certain changes and modifications may be practiced within the scope of the appended claims. It should be noted that there are many alternative ways of implementing both the process and compositions of the present invention. Accordingly, the present embodiments are to be considered as illustrative and not restrictive, and the invention is not to be limited to the details given herein.

All references cited herein are incorporated by reference for all purposes.

What is claimed:

1. A method of joining dissimilar materials having different ductility, the method comprising:
    decorating the more ductile of the materials with particles of a less ductile material by deformation of the more ductile material by forcing particles of the less ductile material into the surface of the more ductile material such that the particles of the less ductile material are mechanically interlocked with the more ductile material to form a composite;
    joining the composite and a joining member comprising a less ductile material by sintering particles of the less ductile material decorated on the more ductile material to the joining member;
    wherein the more ductile material is a metal, the less ductile material decorated on the more ductile material is a ceramic and the joining member is a ceramic or cermet.

2. The method of claim 1, wherein the less ductile material decorated on the more ductile material is the same as the less ductile material of the joining member.

3. The method of claim 1, wherein the less ductile material decorated on the more ductile material is different than the less ductile material of the joining member.

4. The method of claim 1, wherein the joining member is a ceramic.

5. The method of claim 1, further comprising joining an additional member comprising the less ductile material or another material that can sinter-bond to the joining member by sintering, such that the joining member is an interlayer between the composite and the additional member, wherein the additional member is a ceramic or cermet.

6. The method of claim 5, wherein the additional member is a ceramic.

7. The method of claim 6, wherein the additional member is a dense piece and the joining member is a porous piece or particulate.

8. The method of claim 4, wherein the more ductile material is stainless steel and the less ductile material decorated on the more ductile material and the joining member are both the ceramic YSZ.

9. The method of claim 4, wherein the more ductile material is stainless steel, the less ductile material decorated on the more ductile material is YSZ, and the joining member is a mixed ionic-electronic conductor.

10. The method of claim 6, wherein the more ductile material is stainless steel and the less ductile material decorated on the more ductile material, the joining member and the additional member are both the ceramic YSZ.

11. The method of claim 10, wherein the joining member is porous and the additional member is dense.

12. The method of claim 1, wherein the pre-sintered size of the particles of less ductile material used to decorate is between about 10 and 0.05 micrometers.

13. The method of claim 12, wherein the particle size is about 0.5 micrometer.

14. The method of claim 1, wherein the decoration partially covers the more ductile material surface.

15. The method of claim 14, wherein between about 10-80% of the surface area of the more ductile material is decorated with the less ductile material.

16. The method of claim 14, wherein between about 20-30% of the surface area of the more ductile material is decorated with the less ductile material.

17. The method of claim 14, wherein between about 30-60% of the surface area of the more ductile material is decorated with the less ductile material.

* * * * *